Nov. 18, 1924.

A. H. SWEET

BRAKE BAND

Filed Feb. 8, 1923

1,515,910

Inventor;
Alvin H. Sweet, per M. Crandall

Attorney.

Patented Nov. 18, 1924.

1,515,910

UNITED STATES PATENT OFFICE.

ALVIN H. SWEET, OF LOS ANGELES, CALIFORNIA, ASSIGNOR, BY DIRECT AND MESNE ASSIGNMENTS, TO TITLE GUARANTEE AND TRUST COMPANY, TRUSTEE, OF LOS ANGELES, CALIFORNIA.

BRAKE BAND.

Application filed February 8, 1923. Serial No. 617,777.

*To all whom it may concern:*

Be it known that I, ALVIN H. SWEET, a citizen of the United States, residing at Los Angeles, in the county of Los Angeles and State of California, have invented a new and useful Brake Band, of which the following is a specification.

My invention relates to improvements in brake bands, and particularly when they are housed or relatively inaccessible for relining. The objects of my improvement are, first, to provide a sectional lining that may be removed from, or applied to, a brake band without disassembling or removing it from its normal position; and, second, to afford facilities for renewing only a portion of the lining and for re-arranging portions according to their relative condition of wear.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

These objects are attained by the construction illustrated in the accompanying drawing, in which—

Figure 1:
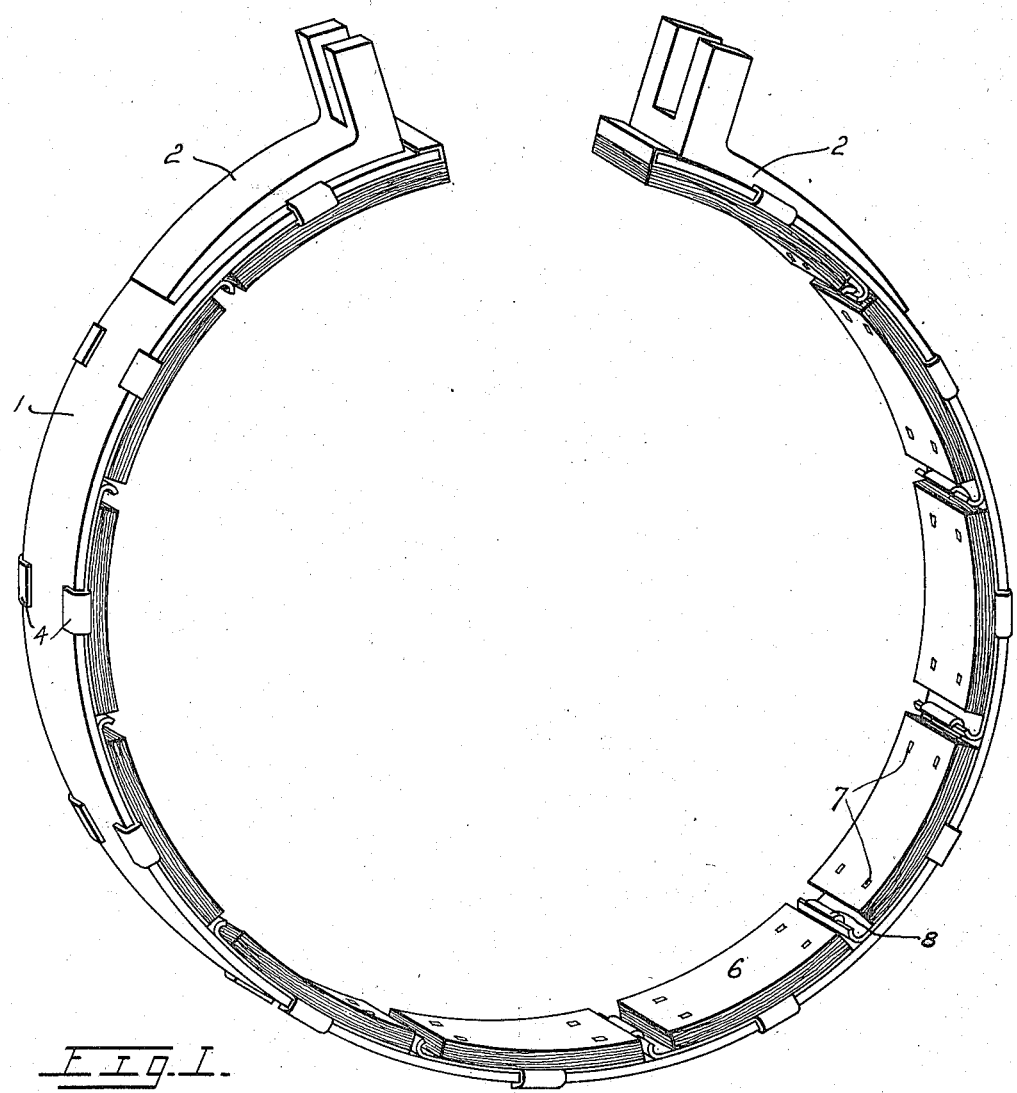
Figure 2:
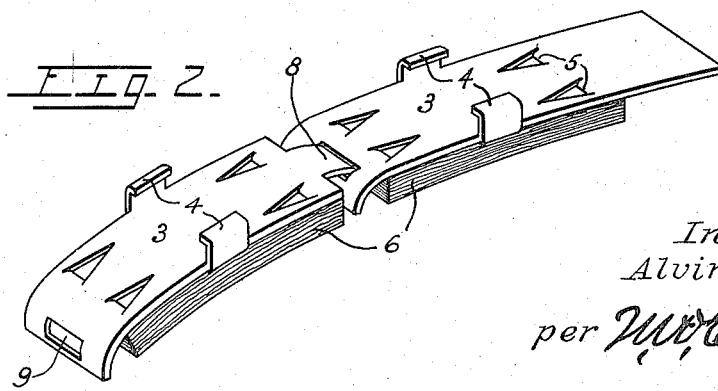

Figure 1 is a perspective view of my improved brake band, and Figure 2 is a similar enlarged view of an end pair of the lining sections.

Similar numerals refer to similar parts throughout both views.

The brake band strap 1 may be of any usual and suitable form except that, where the width of end clips 2 is the same or nearly equal to the width of the strap, their inner edges should be chamfered adjacent the strap. This is to expose the edges of the strap near its ends to afford facilities for engagement by the lugs of the lining sections.

The lining, previous to assembly, comprises a plurality of coupled sections formed substantially as shown in Fig. 2. Of these the backers 3 are preferably made of sheet steel and have at their sides outwardly extending integral flanged lugs 4. The backers have clinch points 5 pressed inwardly from the material of which they are formed, and friction material 6 is attached to the backers by means of these points as indicated in Fig. 1 at 7.

At their respective ends the backers are provided with co-operative coupling means comprising tongues 8 and slots 9, so that they may be hooked together to form a flexible continuously linked lining of the proper length prior to assembling in the brake strap.

It will be apparent that this construction permits of replacing worn sections, or rearranging the sections to compensate for irregular wear, without the necessity of discarding the lining as a whole. It will also be obvious that the lining is flexible and otherwise perfectly adapted for braking purposes.

The application of the lining to the brake band, after assembling the lining sections into a continuous string, consists in slipping it into the strap circumferentially. At the respective ends of the assembled lining the tongue 8 and slotted end 9 are bent so as to hook around the ends of the brake strap, or if preferred the two end sections may be formed like the top section of Fig. 2 with plain ends omitting the tongue or slot.

In a previous application filed July 27, 1922, Serial Number 577,935, which has matured into a Patent Number 1,460,118, June 26, 1923, and in companion applications filed coincidently with this, I have shown somewhat similar brake band construction. None of these applications however claims what is claimed herein.

I claim:

1. A brake lining comprising a plurality of sections having opposed flanged lugs adapted for engaging the edges of a brake strap; said sections being hooked together in mutually interlocked circumferential alignment in such manner as prevents disalignment, independent of the strap.

2. A brake lining comprising a plurality of sections each having a flanged lug at each side adapted for engaging the edge of a brake strap; said sections being hooked together in mutually interlocked circumferential alignment in such manner as prevents disalignment, independent of the strap.

3. A brake lining comprising a plurality of sections having lugs adapted for engaging the edges of a brake strap for positioning said lining axially and radially with respect to said strap; and means for positioning said lining circumferentially with respect to said strap; said sections being hooked together in mutually interlocked circumferential alignment in such manner as prevents disalignment, independent of the strap.

4. In combination; a brake band; a lining comprising a plurality of sections having flanged lugs at each side adapted for engaging the edges of said band for alignment therewith; and means for positioning said lining in fixed circumferential relation to said band; said sections being hooked together in mutually interlocked circumferential alignment in such manner as prevents disalignment, independent of the band.

5. In combination; a brake band; a lining comprising a plurality of sections having flanged lugs at the sides adapted for maintaining said lining in fixed axial and radial relation to said band; and means for positioning said lining in fixed circumferential relation to said band; said sections being hooked together in mutually interlocked circumferential alignment in such manner as prevents disalignment, independent of the band.

ALVIN H. SWEET.